US006556538B1

(12) United States Patent
Croslin (10) Patent No.: US 6,556,538 B1
(45) Date of Patent: Apr. 29, 2003

(54) INTEGRATION OF A CENTRALIZED NETWORK RESTORATION SYSTEM WITH A DISTRIBUTED NETWORK RESTORATION SYSTEM

(75) Inventor: William D. Croslin, Colorado Springs, CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/775,221

(22) Filed: Dec. 31, 1996

(51) Int. Cl.[7] .................................................. H04J 3/14
(52) U.S. Cl. .................. 370/216; 370/295; 379/221.03; 379/221.04
(58) Field of Search ................................ 370/216, 220, 370/242, 244, 250, 225, 396, 398; 340/825.03, 825.06, 825.16; 379/221.03, 221.04; 714/4

(56) References Cited

U.S. PATENT DOCUMENTS

| | | | |
|---|---|---|---|
| 4,577,066 A | 3/1986 | Bimonte et al. | |
| 4,920,529 A | 4/1990 | Sasaki et al. | |
| 5,187,740 A | 2/1993 | Swaim et al. | 379/209 |
| 5,335,268 A | 8/1994 | Kelly, Jr. et al. | 379/112 |
| 5,435,003 A | 7/1995 | Chng et al. | |
| 5,459,716 A | 10/1995 | Fahim et al. | |
| 5,463,615 A | 10/1995 | Steinhorn | |
| 5,623,481 A * | 4/1997 | Russ et al. | 370/225 |
| 5,636,203 A | 6/1997 | Shah | 370/244 |
| 5,646,936 A * | 7/1997 | Shah et al. | 379/221.04 |
| 5,809,286 A * | 9/1998 | McLain et al. | 395/500 |
| 6,018,576 A * | 1/2000 | Croslin | 379/221.04 |
| 6,327,669 B1 * | 12/2001 | Croslin | 714/4 |

FOREIGN PATENT DOCUMENTS

| | | |
|---|---|---|
| EP | 0 494 513 A2 | 12/1991 |
| WO | WO 95/10149 | 4/1995 |

OTHER PUBLICATIONS

Herzberg et al. "The Hop–Limit Approach for Spare–Capacity Assignment in Survivable Networks" IEEE Dec. 3, 1995.
Dighe, et al. "A Link Based Alternative Routing Scheme for Network Restoration under Failure" IEEE May 1995.
Grover et al. "Near Optimal Spare Capacity Planning in a Mesh Restorable Network" IEEE Jan. 1991.
Hasegawa et al. "Dynamic Reconfiguration of Digital Cross–Connect Systems with Network Control and Management" IEEE.
Bellary, et al. "Intelligent Transport Network Survivability: Study of Distributed and Centralized Control Techniques" IEEE 1990.
Shimazaki et al. "Neopilot: An Integrated ISDN Fault Management System" IEEE Feb. 1990.
Shimazaki et al. "Network Fault Management" Sep. 1992.
Newport, et al. "Network Survivability Through Connectivity Optimization" IEEE 1987.

(List continued on next page.)

Primary Examiner—Brian Zimmerman (57) ABSTRACT

A centralized restoration system and a distributed restoration system for restoring a network are integrated. Trunks within the network that have failed are first processed by the distributed restoration system to attempt restoration of the failed trunks. Trunks that cannot be restored by the distributed restoration system and trunks that are designated for restoration by the centralized restoration system are then restored by the centralized restoration system. The centralized restoration system and distributed restoration system communicate to keep each other aware of their respective actions. Mechanisms are utilized to prevent conflict between the two types of restoration systems. The integration of the two types of restoration systems causes high-priority trunks to be quickly restored by the distributed restoration system and lower-priority trunks to be restored by the centralized restoration system to balance the workload of restoration.

20 Claims, 8 Drawing Sheets

OTHER PUBLICATIONS

Flanagan et al. "Principles and Technologies for Planning Survivability–A Metropolitan Case Study", IEEE 1989.

M. Wehr "Protection of Synchronous Transmission Networks", Commutation and Transmission, No. 4, 1993.

Coan, et al. "Using Distributed Topology Update and Preplanned Configurations to Achieve Trunk Network Survivability" IEEE Oct. 1991.

Manione et al. "An Inconsistencies Tolerant Approach in the Fault Diagnosis of Telecommunications Networks" Feb. 14, 1994.

Bouloutas, et al. "Alarm Correlation and Fault Identification in Communication Networks" Feb. 1, 1994.

"A New Distributed Restoration Algorithm to Protect ATM Meshed Networks Against Link and Node Failures"—Nederlof, et al.; ISS 95–Internatonal Switching Symposium, Advanced Switching Technologies for Universal Telecommunications at the Beginning of the 21st Century; vol. 2, No. SYMP. 15; pp. 398–402; Apr. 23–28, 1995.

U.S. patent application Ser. No. 08/493,741 filed Jun. 22, 1995, *System And Method For Reconfiguring A Telecommunications Network To Its Normal State After Repair Of Fault*.

U.S. patent application Ser. No. 08/632,198 filed Apr. 15, 1996, *Minimum Common Span Network Outage Detection And Isolation*.

U.S. patent application Ser. No. 08/632,200, filed Apr. 15, 1996, *Dynamic Network Topology Determination*.

U.S. patent application Ser. No. 08/669,259, filed Jun. 21, 1996, *Topology–Based Fault Analysis In Telecommunications Network*.

U.S. patent application Ser. No. 08/670,872, filed Jun. 26, 1996, *Segment Substitution/Swap For Network Restoration Pre–plans*.

U.S. patent application Ser. No. 08/673,415, filed Jun. 28, 1996, *Realtime Restoration Process*.

U.S. patent application Ser. No. 08/701/514, filed Aug. 22, 1996, *Enhanced Voice Services Load Balancing*.

U.S. patent application Ser. No. 08/758,111, filed Nov. 25, 1996, *Method And Apparatus For Determining Maximum Network Failure Spans For Restoration*.

U.S. patent application Ser. No. 08/753,558, filed Nov. 26, 1996, *Method And Apparatus For Deriving And Representing Physical Network Topology*.

U.S. patent application Ser. No. 08/753,559, filed Nov. 26, 1996, *Method And Apparatus For Isolating Network Failures By Applying Alarms To Failure Spans*.

U.S. patent application Ser. No. 08/753,553, filed Nov. 26, 1996, *Method And Apparatus For Identifying Restoral Routes In A Network*.

U.S. patent application Ser. No. 08/753,560, filed Nov. 26, 1996, *Method And Apparatus For Isolating Network Failures By Correlating Paths Issuing Alarms With Failure Spans*.

U.S. patent application Ser. No. 08/774,599, filed Dec. 30, 1996, *Method And System Of Distributed Network Restoration Using Preferred Routes*.

U.S. patent application Ser. No. 08/777,437, filed Dec. 30, 1996, *Method And System of Distributed Network Restoration With Multiple Failures*.

U.S. patent application Ser. No. 08/777,416, filed Dec. 30, 1996, *Method And System For Selecting Preferred Nodes For Distributed Network Restoration*.

U.S. patent application Ser. No. 08/777,877, filed Dec. 31, 1996, *Method And Apparatus For Creating Preferred Routes For Network Restoration*.

U.S. patent application Ser. No. 08/775,220, filed Dec. 31, 1996, *Centralized Restoration Of Network Using Preferred Routing Tables To Dynamically Build An Available Preferred Restoral Route*.

U.S. patent application Ser. No. 08/775,222, filed Dec. 31, 1996, *Method And Apparatus For Automated Node–Based Normalization After Network Restoration*.

U.S. patent application Ser. No. 08/885,712, filed Jun. 30, 1997, *Method And System For Assigning Spare Transmission Links To Restoral Routes*.

U.S. patent application Ser. No. 08/884,710, filed Jun. 30, 1997, *Method And System For Pre–Patching A Communications Network*.

U.S. patent application Ser. No. 08/884,716, filled Jun. 30, 1997, *Method And System For Augmenting A Communication Network With Spare Capacity*.

U.S. patent application Ser. No. 08/904,095, filed Jul. 31, 1997, *Dynamic Route Generator*.

U.S. patent application Ser. No. 08/910,912, filed Aug. 13, 1997, *Distributed Method And System For Excluding Components From A Restoral Route In A Communications Network*.

U.S. patent application Ser. No. 08/900,697, filed Aug. 13, 1997, *Method For Initiating A Distributed Restoration Process*.

U.S. patent application Ser. No. 08/910,911, filed Aug. 13, 1997, *Centralized Method And System For Excluding Components From A Restoral Route In A Communications Network*.

U.S. patent application Ser. No. 08/938,671, filed Sep. 26, 1997, *System And Method For Emulating Network Outages Using A Segmented Architecture*.

* cited by examiner

INTEGRATION OF A CENTRALIZED NETWORK RESTORATION SYSTEM WITH A DISTRIBUTED NETWORK RESTORATION SYSTEM

TECHNICAL FIELD

The technical field of the present invention relates generally to telecommunication networks and, more particularly, to the integration of a centralized network restoration system with a distributed network restoration system.

BACKGROUND OF THE INVENTION

Telecommunication networks, such as telephone networks, are subject to failure. Given the volume of traffic and the criticality of some of the traffic on such telecommunication networks, it is desirable to be able to restore from failures as quickly as possible. In general, restoration from a failure involves the following four steps: (1) detecting that a failure has occurred; (2) isolating the location of the failure within the network; (3) determining a restoral route that may be used by network traffic; (4) implementing the restoral route.

Approaches for restoring a telecommunications network are generally classified as either being dynamic or static. The static restoration approaches develop "pre-plans" for restoring a telecommunications network. The "pre-plans" are developed by simulating possible network failures and determining restoral routes to restore the network from the simulated network failures. The "pre-plans" are generally developed for a given segment of a network that can incur failure. When a segment fails, the associated "pre-plan" is utilized.

Dynamic restoration approaches dynamically determine restoral routes at the time of failure. The dynamic restoration approaches perform analysis of the telecommunications network at the time of failure to generate the restoral routes. Dynamic restoration approaches generally fall into two categories: centralized restoration methods and distributed restoration methods. With centralized restoration methods, a centralized computer system is responsible for receiving alarms that indicate a failure has occurred, performing analysis to isolate the location of the failure, determining an optimal restoral route and sending commands to implement the restoral route. Distributed restoration methods use the network nodes as the active agents for performing restoration. When the nodes detect a failure, they search for a restoral route by sending messages to each other and attempting various links of potential restoral routes. The distributed restoration methods have the advantage of being faster than the centralized restoration methods; however, not all failures may be resolved and restored by distributed restoration methods. Some nodes of the network are not capable of performing distributed restoration.

SUMMARY OF THE INVENTION

The present invention addresses the limitations of the prior art by integrating a centralized restoration system with a distributed restoration system. The centralized restoration system is a single computer system for restoring the network from failure, whereas the distributed restoration system is distributed among restoration nodes of the network. When a failure occurs in the network, the system will generally attempt to restore the network using the distributed restoration system. If the distributed restoration system fails to restore the network, the centralized restoration system may be utilized. In some instances, the distributed restoration system will be successful and the centralized restoration system need not be utilized.

The network may include trunks that interconnect the nodes so that the nodes may communicate with each other. Trunks may be assigned to the centralized restoration system or the distributed restoration system. When a trunk is assigned to the centralized restoration system, the restoration is performed by the centralized restoration system. In the case where a trunk is assigned to the distributed restoration system, the distributed restoration system first attempts to determine and implement a restoral route for the failure and then, if unsuccessful, asks for assistance from the centralized restoration system.

In general, the distributed restoration system may be first invoked to attempt to restore from a network failure. The distributed restoration system may more quickly restore higher priority portions of the network than the centralized restoration system. The distributed restoration system may then subsequently communicate with the centralized restoration system to indicate whether assistance is required from the centralized restoration system.

BRIEF DESCRIPTION OF THE DRAWINGS

A preferred embodiment of the present invention will be described below relative to the following figures.

DETAILED DESCRIPTION OF THE INVENTION

The preferred embodiment of the present invention provides integration of a centralized restoration system with a distributed restoration system. The preferred embodiment provides arbitration so that there is no conflict between the two types of systems. In general, the preferred embodiment seeks to have the distributed restoration system perform restoration to as great extent as possible and then employs the central restoration system to complete the restoration.

This approach has the dual benefits of maximizing the speed with which restoration is initiated and ensuring completeness of the restoration by employing the central restoration system to ensure that complete restoration may be realized for failures from which the distributed restoration system may not recover.

The preferred embodiment to the present invention utilizes a central restoration system to perform pre-restoration analysis that assigns restoral capacity, determines restoral routes, prioritizes restoral routes, and downloads data specifying restoral routes and parameters to nodes within the network. The central restoration system forwards certain threshold parameters to the distributed restoration system. These thresholds include the number of restoral routes that the distributed restoration system may attempt before passing control to the centralized restoration system. This approach prevents the distributed restoration system from resorting to non-desirable restoral routes when the distributed restoration system attempts to restore the network. The central restoration system may also assign traffic trunks to either the distributed restoration system or the central restoration system. This capability allows high-priority trunks to be assigned to the distributed restoration system for high-speed restoration and lower-priority trunks to be assigned to the centralized restoration system to distribute restoration processing.

Figure 1:
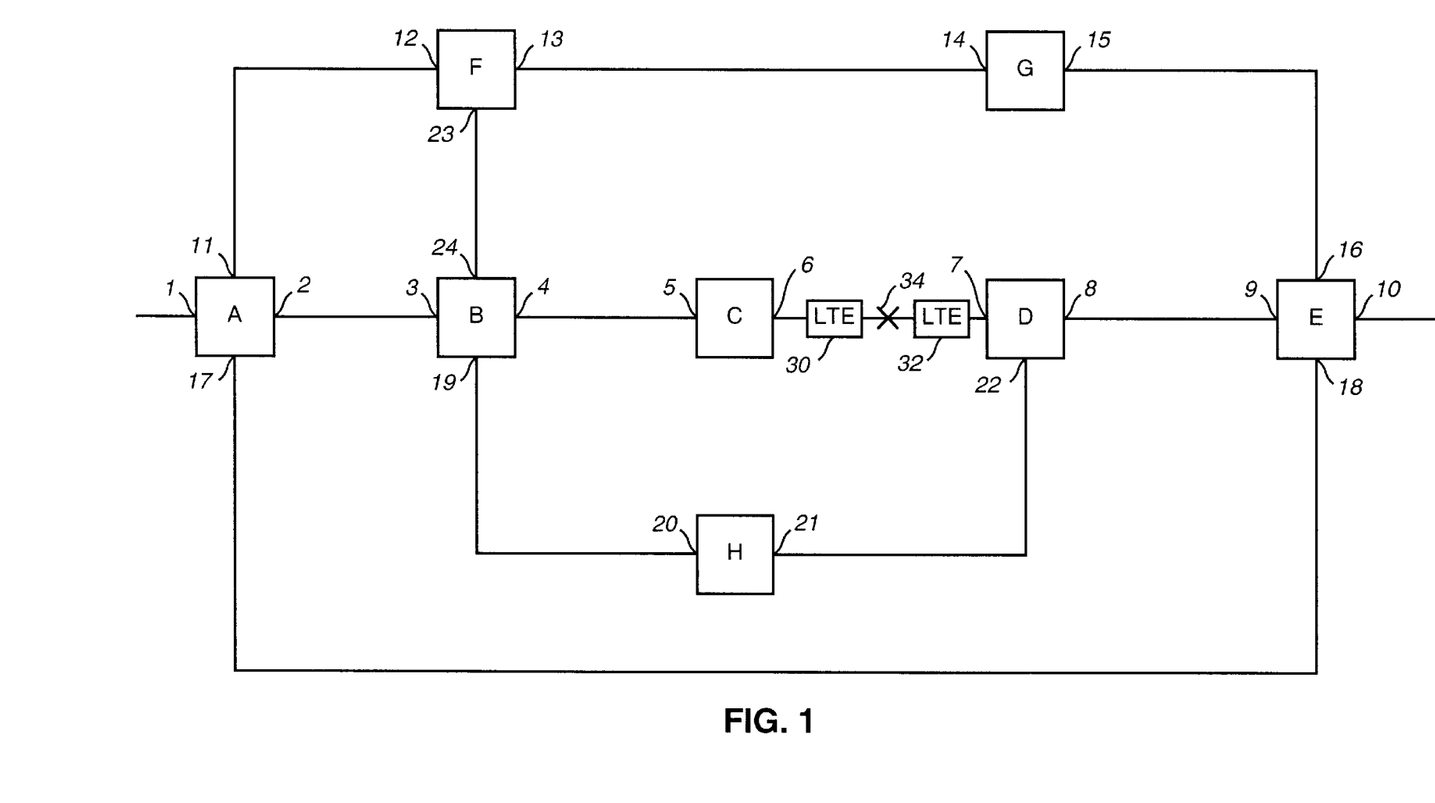
FIG. 1 illustrates a network node topology for a telecommunications network in which the preferred embodiment of the present invention may be practiced.

FIG. 1 illustrates an example topology for a portion of a telecommunications network to which the restoration techniques of the preferred embodiment of the present invention may be applied. For purposes of the discussion below, it is assumed that the telecommunications network is a long-distance-carrier telephone network. Those skilled in the art will appreciate that the network node topology depicted in FIG. 1 is intended to be merely illustrative and not limiting of the present invention. The present invention may be practiced with other network node topologies and on other types of networks. The example network node topology depicted in FIG. 1 will be referenced below in discussing the operation of the preferred embodiment of the present invention.

The network node topology of FIG. 1 includes nodes A, B, C, D, E, F, G, and H. A "node" as used hereinafter is a physical link in a network that represents a terminal or a system. A node may be, for example, a digital cross-connect (DXC) system, a multiplexing system, line-termination equipment, a fiber-transmission system, etc. FIG. 1 only depicts nodes that are used in the network restoration process (i.e., "restoration nodes"). The nodes that are not useful for network restoration (i.e., "intervening nodes"), such as nodes containing only digital repeater equipment, are found in the network but are not depicted in FIG. 1. Each of the nodes has one or more ports for interfacing the nodes with links. For instance, node A has ports 1–11 and 17. As can be seen in FIG. 1, nodes B–H include ports 3–10, 12–16, and 18–24. A "link," as used hereinafter, is a physical connection between two nodes for carrying network traffic. Links interconnect the nodes A–H. A single link usually includes multiple trunks, where a "trunk," as used hereinafter, is a logical channel of communication with capacity that traverses one or more nodes and/or one or more links between nodes. The trunk acts as a channel of communication to the network of a given bandwidth. A single trunk generally includes one or more links that span multiple nodes. A single trunk connects nodes A, B, C, D, and E.

FIG. 1 also depicts line-termination equipment (LTE) 30 and 32 that is positioned between nodes C and D. For purposes of the discussion below, it is assumed that a failure 34 occurs on the link that connects nodes C and D. This failure is indicated by an "X" in FIG. 1. The failure may be caused by a number of different sources, and the nature of the failure is not related to the focus of this invention.

The preferred embodiment of the present invention provides a central restoration system 40 (FIG. 2) for restoring a failure within the network. Each node A–H includes at least one data link 36, 37, 38, 39, 41, 42, 43, and 44 with the centralized restoration system 40. The centralized restoration system 40 may be implemented on a computer system like that depicted in FIG. 3. Those skilled in the art will appreciate that the computer system shown in FIG. 3 is intended to be merely illustrative and not limiting of the present invention. Examples of computer systems suitable for the centralized restoration system include the VAX line of computers from Digital Equipment Corporation and the RS 6000 from International Business Machines Corporation. As can be seen in FIG. 3, the centralized restoration system computer includes a central processing unit (CPU) 58 for controlling operation of the centralized restoration system 40. The computer system may also include a video display 60 and a keyboard 62. A primary memory 64 holds a copy of restoration program 72 that holds instructions for performing centralized network restoration and for conducting communications with the distributed restoration system. The primary memory 64 also holds a database 74 for storing tables and other useful information that facilitate restoration. The centralized restoration system may also include a secondary storage 66, such as a hard disk drive. Additional peripheral devices, such as a network adapter 68 and a modem 70, may be included as part of the computer system of the centralized restoration system.

Figure 2:
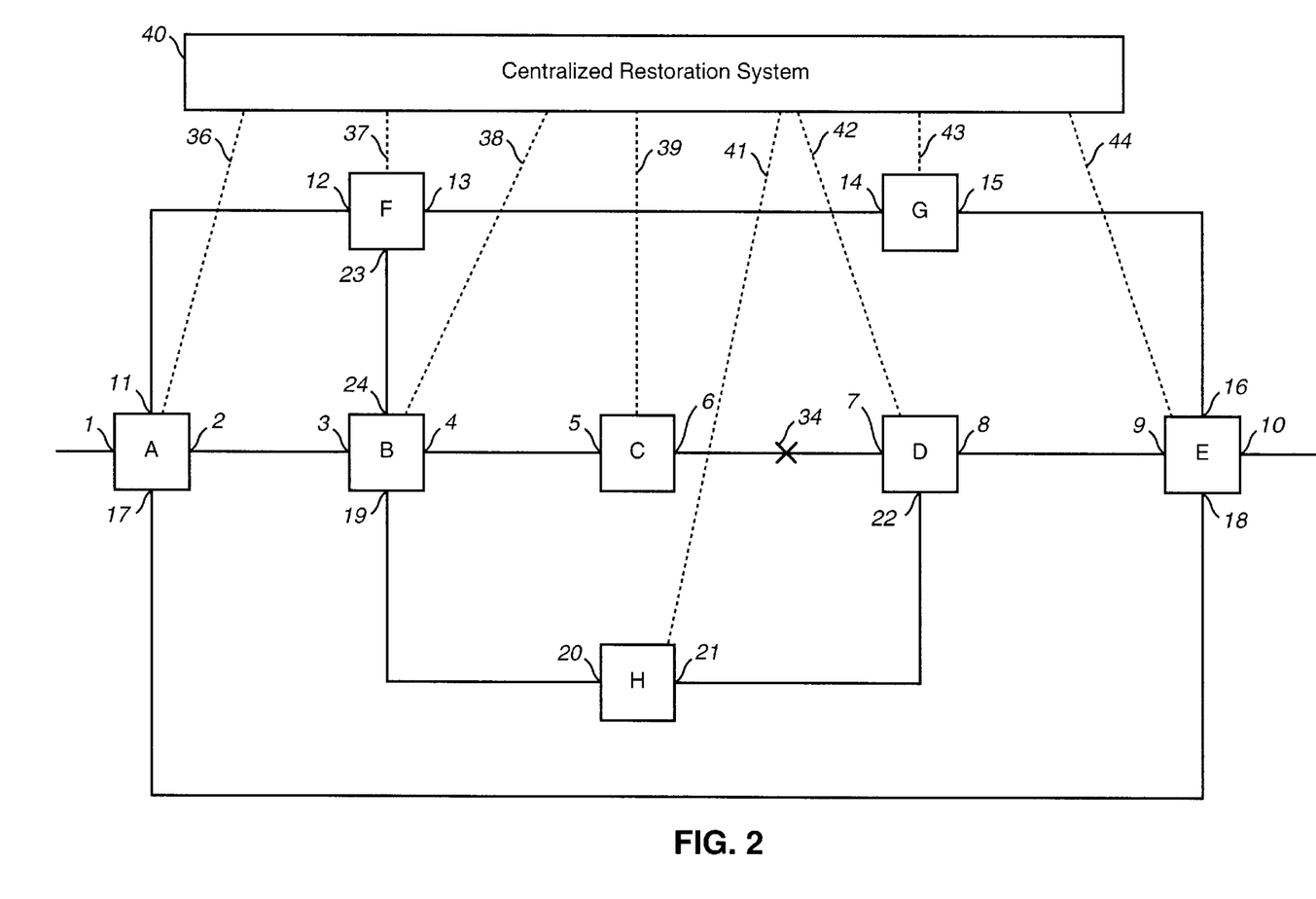
FIG. 2 illustrates a telecommunications network in which the preferred embodiment of the present invention may be practiced.
Figure 3:
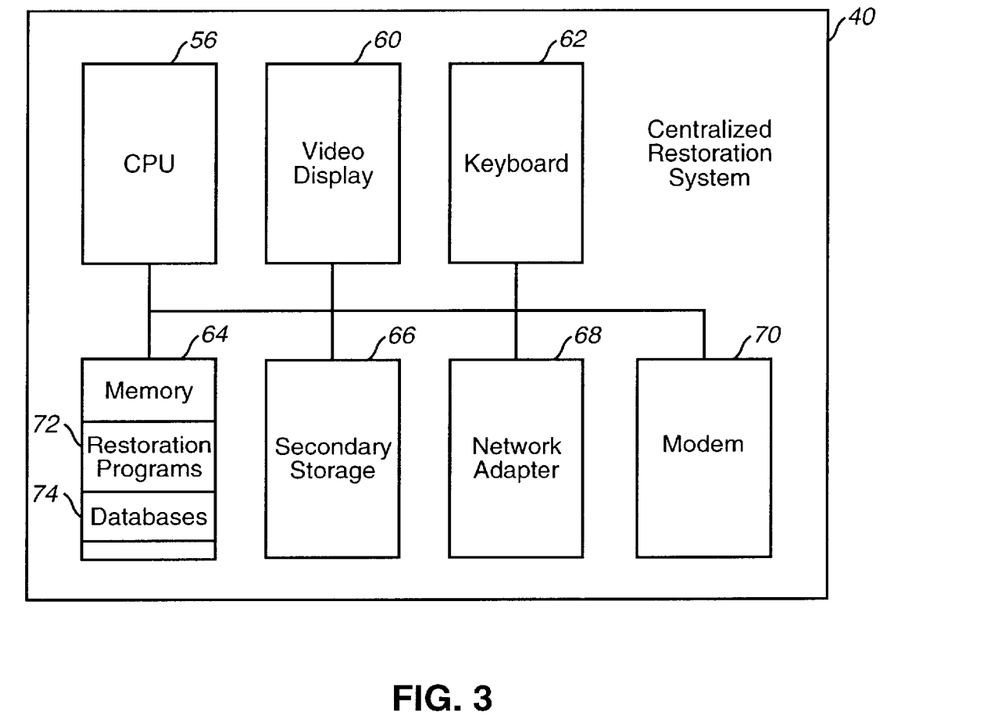
FIG. 3 is a block diagram illustrating an example of a computer system that is suitable for use as the centralized restoration system of FIG. 2.
Figure 4:
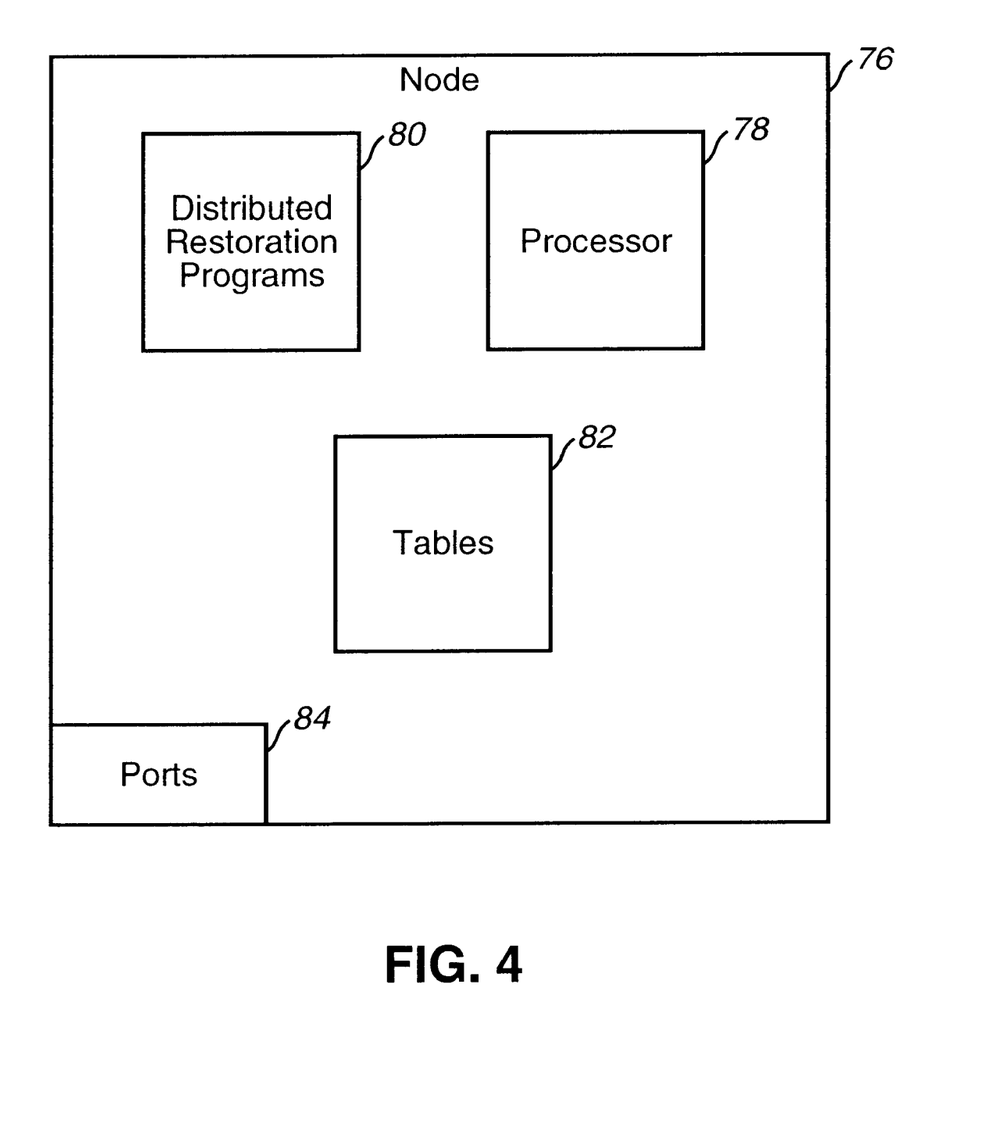
FIG. 4 is a block diagram illustrating components of a node used in a distributed restoration system of the preferred embodiment of the present invention.

Each of the restoration nodes A–H depicted in FIG. 2 include support for performing the distributed restoration system. FIG. 4 depicts an example of the components within a node 76 that are useful for performing the preferred embodiment of the present invention. The node includes a processor 78 that is capable of running a distributed restoration program 80 for performing operations as part of the distributed restoration system. These programs utilize data tables 82. The node 76 includes a set of ports 84 for interfacing with links that lead to other nodes. Those skilled in the art will appreciate that the nodes may have a different configuration other than that depicted in FIG. 4. Certain nodes may include multiple processors and additional components. Alternatively, the nodes may have facilities for realizing a more limited level of intelligence (other than a processor) that supports the distributed restoration system.

A suitable centralized restoration system is described in more detail in copending application entitled "Centralized Restoration of a Network Using Preferred Routing Tables to Dynamically Build and Available Preferred Restoral Route," which was filed on Dec. 30, 1996, and given application Ser. No. 08/774,599, now U.S. Pat. No. 6,031,599, which is assigned to a common assignee, and which is explicitly incorporated by reference herein. A suitable distributed restoration system for use in the preferred embodiment of the present invention is described in copending application entitled "Method and System of Distributed Network Restoration Using Preferred Routes," which was filed on Dec. 31, 1996, and given application Ser. No. 08/775,220, now U.S. Pat. No. 6,327,669, which is assigned to a common assignee and which is explicitly incorporated by reference herein.

Figure 5:
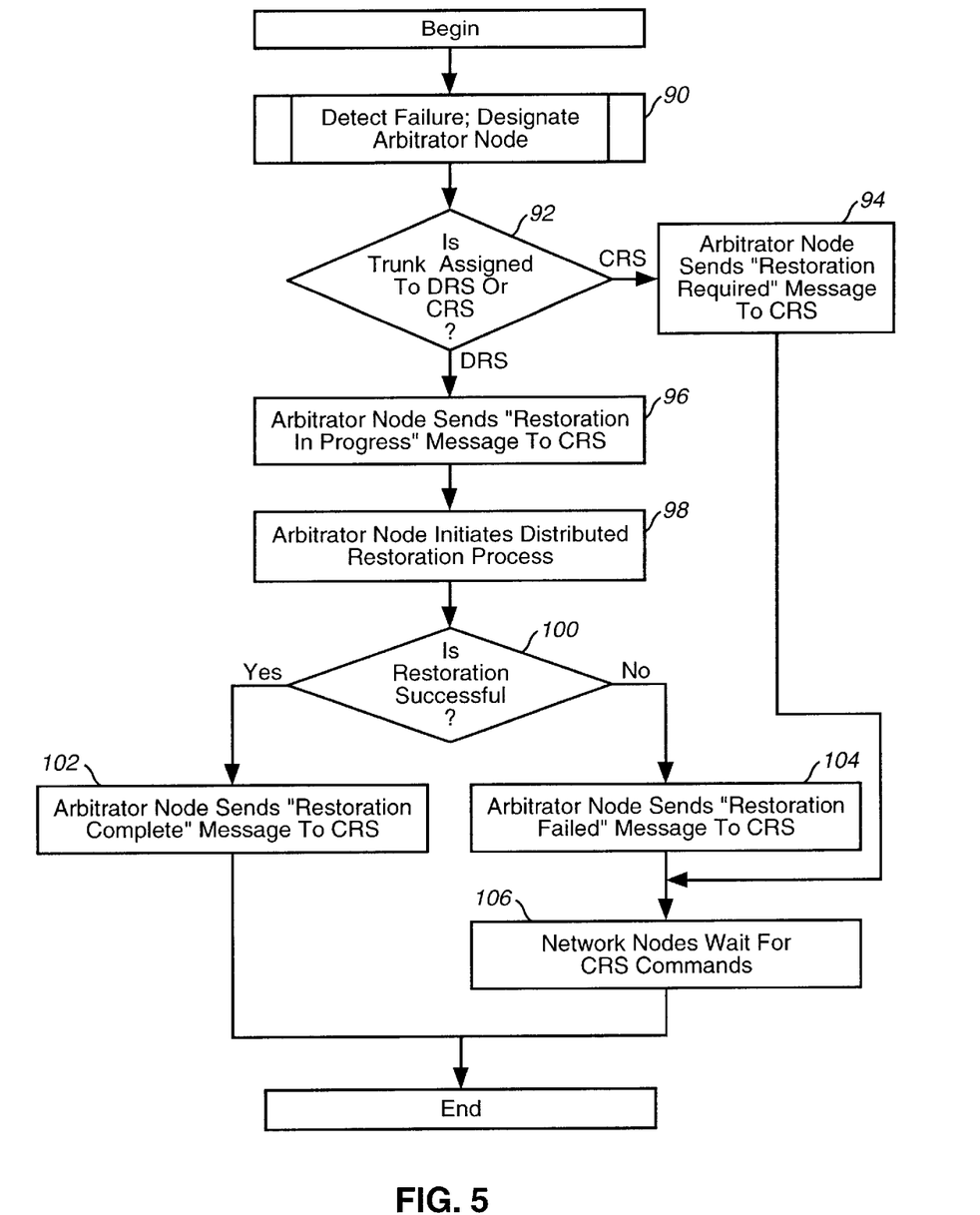
FIG. 5 is a flow chart providing an overview of the steps performed in the preferred embodiment of the present invention.
Figure 6:
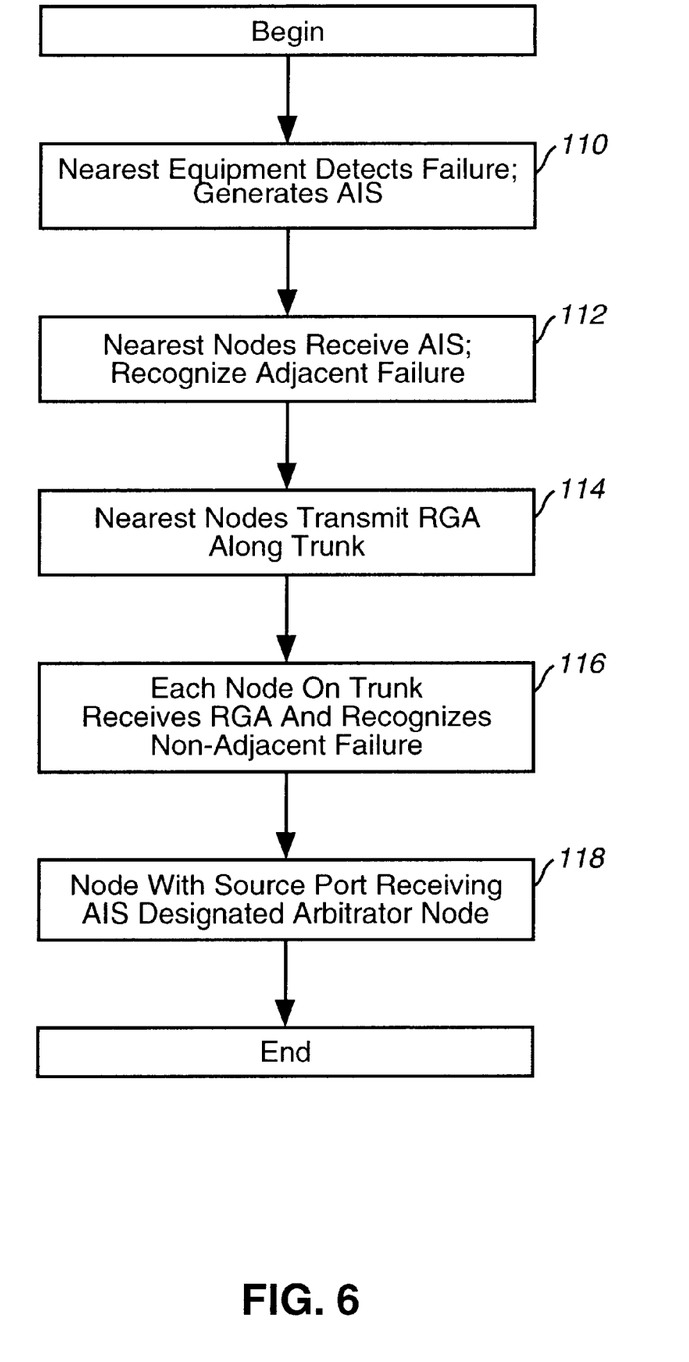
FIG. 6 is a flow chart illustrating the steps that are performed to detect the failure and generate an alarm message in accordance with the preferred embodiment of the present invention.

FIG. 5 provides an overview of the steps performed by the method of the preferred embodiment of the present invention. Initially, a failure is detected within the network and the distributed restoration system acts to designate an arbitrator node (step 90 in FIG. 5). FIG. 6 shows a flow chart that illustrates in more detail the steps that are performed to detect the network failure and designate an arbitrator node as part of step 90 of FIG. 5. After a failure occurs, the equipment that is nearest to the point of failure generates an alarm-in-signal (AIS) message (step 110 in FIG. 6). For the example depicted in FIG. 1, the line terminal equipment 30 and 32 detect the failure and generate such AIS messages. This line-termination equipment 30 and 32 is capable of detecting impairments of signals to trigger generation of such messages. The AIS messages are transmitted down the trunk in which the failure occurred in the direction opposite of the failure. The nearest nodes to the point of failure receive the AIS messages and recognize that there is a failure (step 112 of FIG. 6). The nodes that receive the AIS messages also recognize that they are the nearest nodes to the failure. In an example case depicted in FIG. 1, node C would receive an AIS message from line-termination equipment 30 and node D would receive an AIS message from line-termination equipment 32. Upon receipt of these messages, node C and D would know that a failure has occurred and that they are the closest nodes to the failure.

The notes that are nearest to the point of failure receive the AIS messages and then transmit a regenerated alarm (RGA) along the trunk in the direction opposite the failure (step 114 in FIG. 6). Thus, for the example case, node C would generate an RGA and send it towards node B, and node D would generate an RGA and send it towards node E. Each node along the failed trunk received the RGA and recognizes the failure. These nodes also recognize that they are not the nodes nearest to the failure (step 116 in FIG. 6). The node that receives the AIS message on its source port is designated as the arbitrator node (step 118 in FIG. 6). The source port of a node is the output port along the trunk. For the example case depicted in FIG. 1, node C would be designated as the arbitrator node because it receives the AIS message on source port 6. This process depicted in FIG. 6 is described in more detail in the copending application entitled "Method and System of Distributed Network Restoration Using Preferred Routes," which was filed on Dec. 30, 1996, and given application Ser. No. 08/774,599, now U.S. Pat. No. 6,031,599, which is assigned to a common assignee and which is explicitly incorporated by reference herein.

An arbitrator node is designated for each failed trunk. It should be appreciated that multiple trunks may simultaneously fail within a telecommunications network. A single failure may result in the generation of multiple arbitrator nodes, where each arbitrator node arbitrates for multiple trunks. The role of the arbitrator node is to initiate the distributed restoration process and to serve as a mediator between the distributed restoration system and the centralized restoration system in the process of restoring a given trunk.

After the failure has been detected and the arbitrator node designated in step 90 of FIG. 5, a determination is made whether the trunk at which the failure occurred is assigned to the distributed restoration system (DRS) or the centralized restoration system (CRS) (step 92 in FIG. 5). The assignment of a trunk as a candidate for the distributed restoration system or the centralized restoration system is programmed into each node in each port. The centralized restoration system 40 may make this determination prior to network failure. It should be appreciated, that step 92 is not a necessary step for performing the present invention; rather, automatic assignment plans may be utilized. For example, all trunks may automatically be assigned to be restored by the distributed restoration system. As was mentioned above, the assignment of a trunk to the distributed restoration system and other trunks to centralized restoration system seeks to strike a balance where high-priority trunks are quickly restored and lower-priority trunks are more slowly restored, but the workload of restoration is more evenly shared between the distributed restoration system and the centralized restoration system. In the case where the trunk is designated for restoration by the centralized restoration system, the arbitrator node sends a "restoration required" message to the centralized restoration system 40 (step 94 in FIG. 5). The centralized restoration system receives this message and then performs steps to restore the failed trunk, as will be described in more detail below.

If in step 92 it is determined that the trunk is assigned for restoration by the distributed restoration system, a different set of steps are performed. First, the arbitrator node sends a "restoration in progress" message to the centralized restoration system 40 (step 96 in FIG. 5). This message informs the centralized restoration system 40 that the distributed restoration system is attempting to restore the failed trunk and keeps the centralized restoration system from interfering in the restoration until a certain amount of time has elapsed or until the distributed restoration system has indicated that the restoration is complete or has failed. The arbitrator node then initiates the distributed restoration process (step 98 in FIG. 5).

The next steps that are performed by the preferred embodiment of the present invention depend on whether the distributed restoration was successful or not. In step 100 of FIG. 5, the system checks whether the restoration was successful. If the restoration was successful, the arbitrator node sends a "restoration complete" message to the centralized restoration system 40 (step 102 in FIG. 5). This message tells the centralized restoration system 40 that there is no need for the centralized restoration system to attempt to restore the failed trunk; rather, the distributed restoration system has completed the task. On the other hand, if it is determined that the restoration was not successful in step 100 of FIG. 5, the arbitrator node sends a "restoration failed" message to the centralized restoration system 40 (step 104 in FIG. 5). The "restoration failed" message tells the centralized restoration system 40 that the distributed restoration system was not successful in attempting to restore the failed trunk and that the centralized restoration system must take steps to attempt to restore the failed trunk. The nodes in the network then wait for centralized restoration system commands over the data links 36, 37, 38, 39, 41, 42, 43, and 44 to effect centralized restoration (step 106 in FIG. 5).

Figure 7:
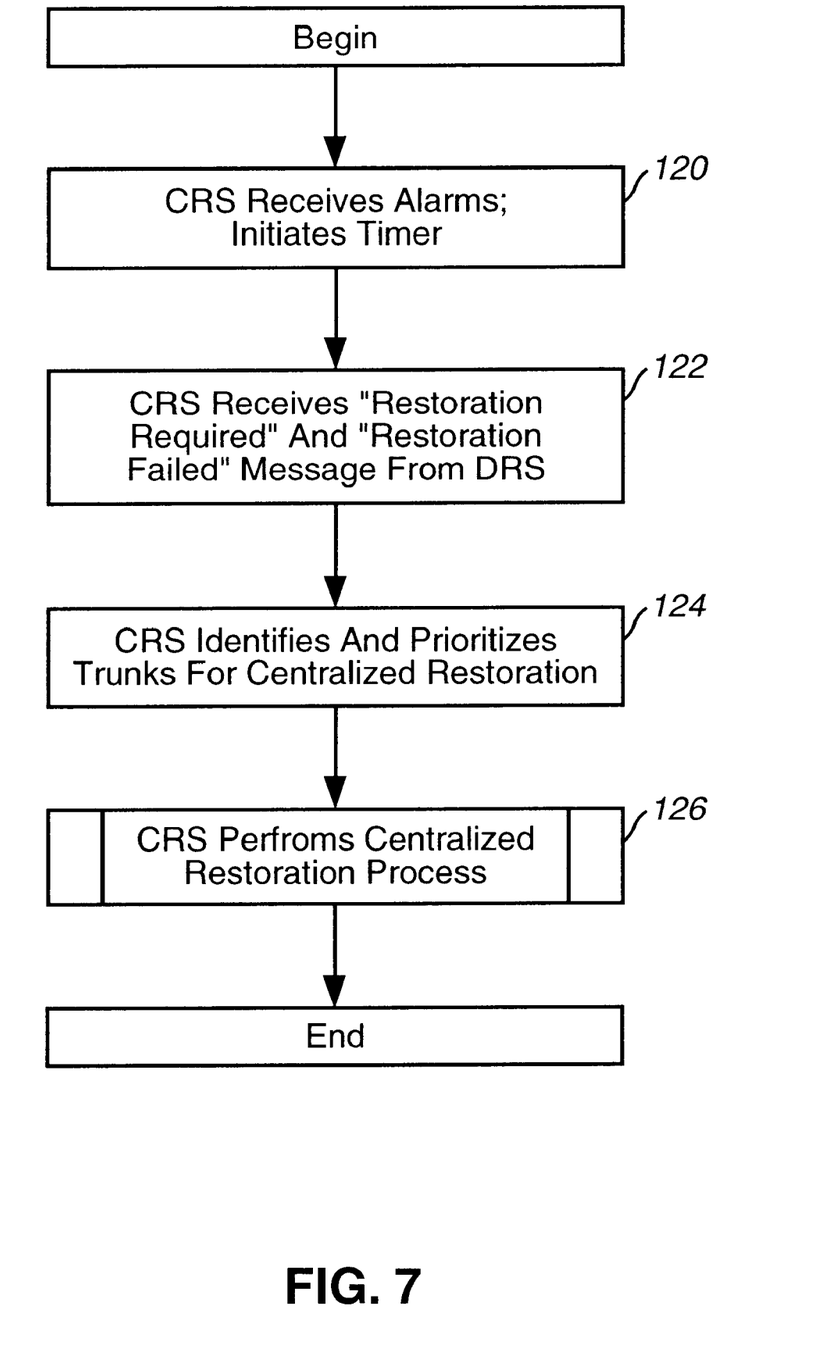
FIG. 7 is a flow chart illustrating the steps that are performed by the centralized restoration system in the preferred embodiment of the present invention.

FIG. 7 depicts the steps that are performed by the centralized restoration system 40 during restoration. Initially, the centralized restoration system 40 receives the alarms indicating that a failure has occurred. The centralized restoration system 40 sets a timer in response to the receipt of the alarms (step 120 in FIG. 7). The purpose of the timer is to give the distributed restoration system a fixed amount of time in which to restore a failed trunk. If the failed trunk is not restored within the time frame set by the timer, the centralized restoration system intervenes to restore the failed trunk. This timer is set to delay any restoration until a failure is assumed. The timer helps to filter out false alarms, noise and trivial interruptions in network traffic. The timer is set for a much longer period of time than the distributed restoration system requires to restore a failed trunk. The timer is set for such an extended duration to ensure that the distributed restoration system has had sufficient time to make all appropriate attempts at restoration before handing off the task of restoration to the centralized restoration system.

The centralized restoration system 40 then receives "restoration required" and/or "restoration failed" messages from the distributed restoration system regarding any trunks that require intervention of the centralized restoration system (step 122 in FIG. 7). The centralized restoration system 40 identifies each trunk that requires restoration by the centralized restoration system. These trunks correspond to those identified by "restoration required" messages, "restoration failed" messages, and trunks assigned to the centralized restoration system, as checked in step 92 of FIG. 5. The database 74 of the centralized restoration system 40 includes information regarding priority of trunks. This information is used to prioritize the restoration of the identified trunks (step 124 in FIG. 7). The centralized restoration system 40 then performs centralized restoration on each of the identified and prioritized trunks (step 126 in FIG. 7).

Figure 8:
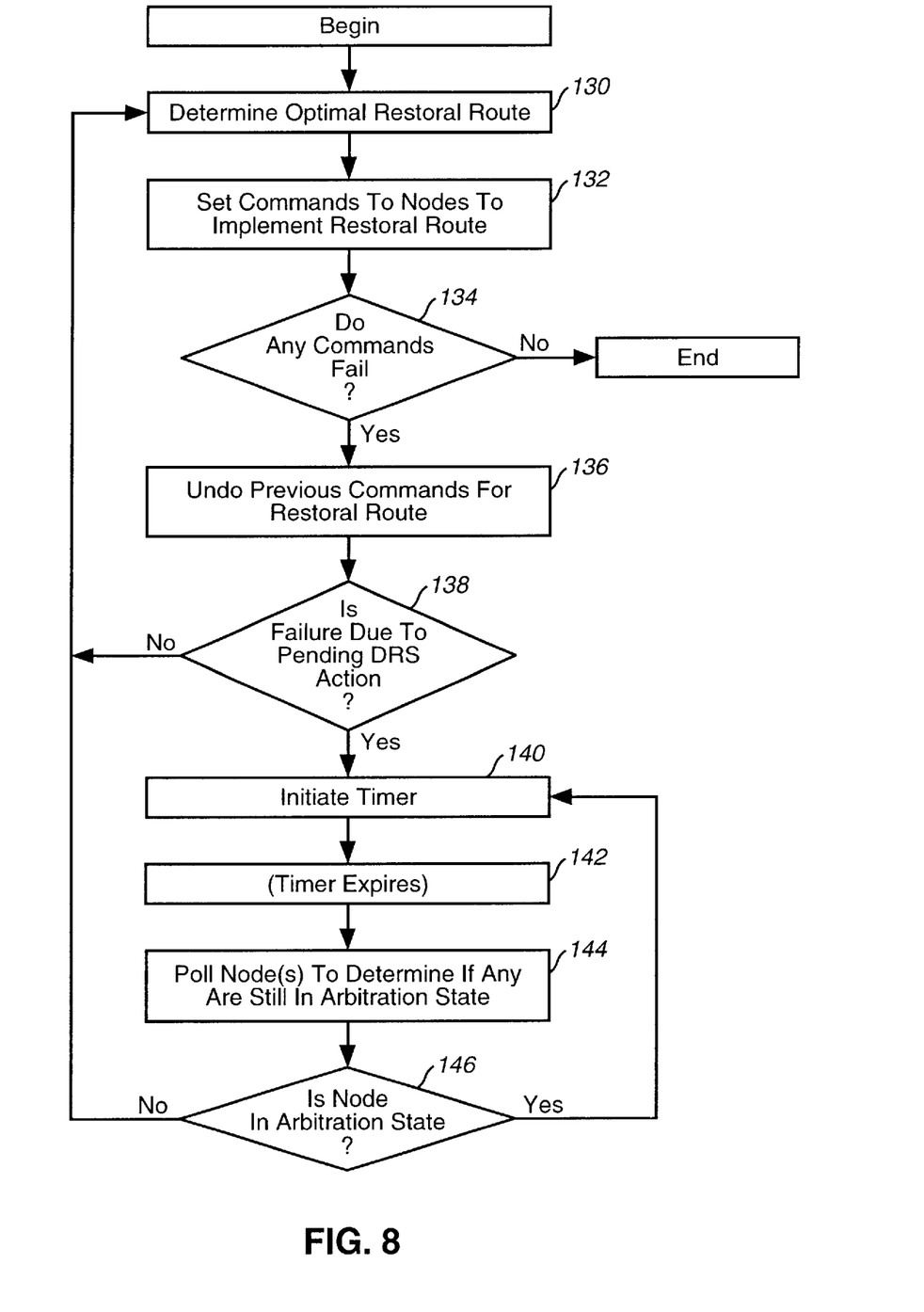
FIG. 8 is a flow chart illustrating the steps that are performed by the centralized restoration system in restoring a failed trunk.

FIG. 8 depicts the process of performing the centralized restoration of step 126 of FIG. 7. Additional detail regarding the centralized restoration system is described in the copending application entitled "Centralized Restoration of a Network Using Preferred Routing Tables to Dynamically Build and Available Preferred Restorer Route," which was filed on Dec. 31, 1996, and given application Ser. No. 08/775,220, now U.S. Pat. No. 6,327,669, which is assigned to a common assignee, and which is explicityly incorporated by reference herein. In general, the centralized restoration system 40 iteratively builds an optimal restoral route based on preferred routing tables that identify preferred ports for restoral routes (step 130 in FIG. 8). The optimal restoral route is built on a link-by-link basis by identifying the optimal port for each of the nodes in one or more restoral routes. Unavailable links are eliminated from the optimal restoral route to account for changes in network topology and configuration. The centralized restoration system then sends commands to implement the optimal restoral route over the data links 36, 37, 38, 39, 41, 42, 43, and 44 (step 132 in FIG. 8). The centralized restoration system 40 checks whether any of the commands failed (step 134 in FIG. 8). If no other commands failed, the associated trunk is restored and the steps in FIG. 8 may be repeated for the other failed trunks.

If any of the commands fail, the centralized restoration system 40 performs steps to undo the previous commands that were issued for the restoral route in step 132 of FIG. 8 (step 136 in FIG. 8). The undoing of these commands is also achieved over the data links 36, 37, 38, 39, 41, 42, 43, and 44. The centralized restoration system 40 checks whether the failure is due to pending action by the distributed restoration system (step 138 in FIG. 8). An example helps to illustrate such a case. If the centralized restoration system 40 sends a command to node F to cross connect port 13 to port 12 to implement a restoral route and node F is in the process of implementing another restoral route per instructions by the distributed restoration system that requires connecting port 13 to port 23, node F may send a message to node G to implement this link and be waiting for a response. If during such time frame, node F receives the centralized restoration system command to connect port 13 to port 12, node F will not perform the command but will respond with the message that it is in the process of another action involving port 13. In such an instance, the centralized restoration system 40 initiates a timer (step 140 in FIG. 8) to allow the distributed restoration system to complete its action. When the timer expires (step 142 in FIG. 8), the centralized restoration system polls the nodes in the restoration path to determine if there are any nodes that are still in the arbitration state (step 144 in FIG. 8). If there are no longer any nodes in the arbitration state, the process of determining an optimal restoral route is repeated. If, on the other hand, in step 146 it is determined that there is a node in the arbitration state, the centralized restoration system again sets the timer to attempt to wait out the steps being performed by the distributed restoration system. Those skilled in the art will appreciate that the centralized restoration system may include a mechanism for only waiting on the distributed restoration system a fixed number of time sequences before treating the process beginning with step 130.

While the present invention has been described with reference to a preferred embodiment thereof, those skilled in the art will appreciate that various changes in form and detail may be made without departing from the intended scope of the present invention, as defined in the appended claims. For example, the present invention may be practiced with different centralized restoration methods and different dynamic restoration methods than those outlined above. Moreover, the present invention need not be practiced with a long distance carrier telephone network but may instead be practiced in a wide variety of types of networks.

What is claimed is:

1. In a network having interconnected nodes that communicate with each other, a method comprising the steps of:

providing a centralized restoration system having a computer system for restoring the network from failure;

providing a distributed restoration system having multiple restoration nodes for restoring the network from failure;

upon failure in the network, first attempting to restore the network using the distributed restoration system, wherein the distributed restoration system informs the centralized restoration system of a successful restoration of the network to prevent the centralized restoration system from attempting to restore the network; and if the distributed restoration system fails to restore the network, restoring the network using the centralized restoration system.

2. The method of claim 1 wherein multiple failures have occurred in the network, wherein the distributed restoration system restores the network from at least one of the failures and the centralized restoration system restores the network from at least one of the failures.

3. The method of claim 1 wherein the nodes are connected by trunks and wherein the method further comprises the step of assigning at least one selected trunk for restoration by the distributed restoration system.

4. The method of claim 1 wherein the network is a telecommunications network.

5. The method of claim 1 wherein the distributed restoration system attempts to restore the network from the failure by attempting to formulate by the restoration nodes a restoral path among the nodes that bypasses the failure.

6. The method of claim 5 wherein the distributed restoration system dynamically attempts to formulate the restoral path upon the failure of the network.

7. The method of claim 1 wherein the centralized restoration system restores the network from the failure by dynamically determining a restoral path among the nodes for bypassing the failure.

8. In a network having interconnected nodes that communicate with each other via trunks, a method comprising the steps of:

providing a centralized restoration system having a computer system for restoring the network from failure;

providing a distributed restoration system having multiple restoration nodes for restoring the network from failure;

if the distributed restoration system fails to restore the network, restoring the network using the centralized restoration system, wherein one of the trunks is assigned for restoration by the centralized restoration system when the one trunk fails; and if the failure is on the one trunk, preventing attempted restoration by the distributed restoration system.

9. A method of restoring a network having a plurality of nodes, the method comprising:

detecting a given failure with the network;

setting a timer upon detection of the given failure;

receiving an indication from a distributed restoration system that a centralized restoration system needs to restore the network from the given failure; and upon expiration of the timer, restoring the network from the given failure by the centralized restoration system.

10. The method of claim 9 wherein the indication that the centralized restoration system needs to restore the network from the given failure is an indication the distributed restoration system was unsuccessful in restoring the network from the given failure.

11. The method of claims 9 wherein restoring the network from the given failure comprises determining a restoral route among the nodes for bypassing the failure and implementing the restoral route.

12. The method of claim 11 wherein implementing the restoral route comprises sending commands to at least some of the nodes from the centralized restoration system.

13. A method of restoring a network having a plurality of nodes, the method comprising:

detecting a given failure with the network that includes trunks that interconnect the nodes;

receiving an indication from a distributed restoration system that a centralized restoration system needs to restore the network from the given failure; and restoring the network from the given failure, wherein the given failure includes failure of multiple trunks, and the centralized restoration prioritizes the trunks that failed and restores the trunks in sequence based on priorities of the trunks.

14. A method of restoring a network having a plurality of nodes, the method comprising:

detecting a given failure with the network;

receiving an indication from a distributed restoration system that a centralized restoration system needs to restore the network from the given failure; and restoring the network from the given failure, including, determining a restoral route among the nodes for bypassing the failure and implementing the restoral route, and if a selected command sent to the nodes is not successful, determining whether the failure of the selected command is due to actions by the distributed restoration system.

15. The method of claim 14 wherein if the failure of the selected command is due to actions by the distributed restoration system, waiting a predetermined period of time before continuing with restoration by the centralized restoration system.

16. In a network having interconnected nodes that communicate with each other, a computer-readable medium holding computer-executable instructions for performing a method comprising the steps of:

providing a centralized restoration system having a computer system for restoring the network from failure;

providing a distributed restoration system having multiple restoration nodes for restoring the network from failure;

upon failure in the network, first attempting to restore the network using the distributed restoration system, wherein the distributed restoration system informs the centralized restoration system of a successful restoration of the network to prevent the centralized restoration system from attempting to restore the network; and if the distributed restoration system fails to restore the network, restoring the network using the centralized restoration system.

17. The computer-readable medium of claim 16 wherein multiple failures have occurred in the network, wherein the distributed restoration system restores the network from at least one of the failures and the centralized restoration system restores the network from at least one of the failures.

18. The computer-readable medium of claim 16 wherein the distributed restoration system attempts to restore the network from the failure by attempting to formulate by the restoration nodes a restoral path among the nodes that bypasses the failure.

19. The computer-readable medium of claim 18 wherein the distributed restoration system dynamically attempts to formulate the restoral path upon the failure of the network.

20. A method for supporting central and distributed restoration of a network, the method comprising:

upon failure in the network, initiating restoration of the network using a distributed restoration system that selectively informs a centralized restoration system of a successful restoration of the network to prevent the centralized restoration system from initiating restoration of the network; and if the distributed restoration system fails to restore the network, restoring the network using the centralized restoration system.

* * * * *